US009141665B1

(12) United States Patent
Munro et al.

(10) Patent No.: US 9,141,665 B1
(45) Date of Patent: Sep. 22, 2015

(54) OPTIMIZING SEARCH SYSTEM RESOURCE USAGE AND PERFORMANCE USING MULTIPLE QUERY PROCESSING SYSTEMS

(75) Inventors: Timothy Peter Munro, Victoria (CA); Ali M. Nassaje, Victoria (CA); Lindsay S. Martin, Victoria (CA); Derek B. Gourlay, Port Coquitlam (CA); Volker R. A. Tilgner, Victoria (CA); Jonathan B. Handler, Redwood City, CA (US)

(73) Assignees: A9.com, Inc., Palo Alto, CA (US); AbeBooks Inc., Victoria (CA)

( * ) Notice: Subject to any disclaimer, the term of this patent is extended or adjusted under 35 U.S.C. 154(b) by 383 days.

(21) Appl. No.: 13/584,691

(22) Filed: Aug. 13, 2012

(51) Int. Cl.
*G06F 17/30* (2006.01)

(52) U.S. Cl.
CPC .............................. *G06F 17/30442* (2013.01)

(58) Field of Classification Search
CPC ................................................ G06F 17/30442
USPC .................................. 707/706, 713, 720, 769
See application file for complete search history.

(56) References Cited

U.S. PATENT DOCUMENTS

| 7,165,071 B2 * | 1/2007 | Fanning et al. ......... 707/999.002 |
| 7,716,236 B2 * | 5/2010 | Sidhu et al. .................... 707/766 |
| 7,779,009 B2 * | 8/2010 | Chowdhury et al. .......... 707/737 |
| 8,725,716 B1 * | 5/2014 | Riley et al. ..................... 707/707 |
| 2003/0135582 A1 * | 7/2003 | Allen et al. .................... 709/217 |
| 2006/0288001 A1 * | 12/2006 | Costa et al. ......................... 707/5 |
| 2009/0327242 A1 * | 12/2009 | Brown et al. ...................... 707/3 |
| 2011/0022586 A1 * | 1/2011 | Wilkinson et al. ............ 707/720 |
| 2011/0251789 A1 * | 10/2011 | Sanders et al. ................ 701/202 |
| 2013/0290343 A1 * | 10/2013 | Kruglick ....................... 707/741 |

* cited by examiner

*Primary Examiner* — Scott A Waldron
(74) *Attorney, Agent, or Firm* — Knobbe, Martens, Olson & Bear, LLP

(57) ABSTRACT

The present disclosure provides a system and methods for intelligently optimizing search system resource usage and performance using multiple data store technologies. A search query optimization system may utilize multiple query processors, such as a general search engine and one or more specialized data stores, to efficiently and intelligently manage and route queries. The search query optimization system may be configured to evaluate the performance of the various query processors for various types of queries, and may use this information to intelligently route search queries to the query processors best suited to service them.

21 Claims, 5 Drawing Sheets

OPTIMIZING SEARCH SYSTEM RESOURCE USAGE AND PERFORMANCE USING MULTIPLE QUERY PROCESSING SYSTEMS

BACKGROUND

Databases continue to store increasingly large amounts of data. To reduce or eliminate data redundancies across large data sets, databases can be normalized, leading to more complex and abstract design and architecture. The large volume of data stored and the complexity in database system design have contributed to the growth of general search engines and systems as tools to access and use the stored data. General full featured search engines often utilize multiple search indexes in order to aid in answering any search query submitted to such data stores. Full featured search engines and systems designed to be robust and flexible can also lead to complex search engine architecture and performance concerns.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Overview

Figure 1:
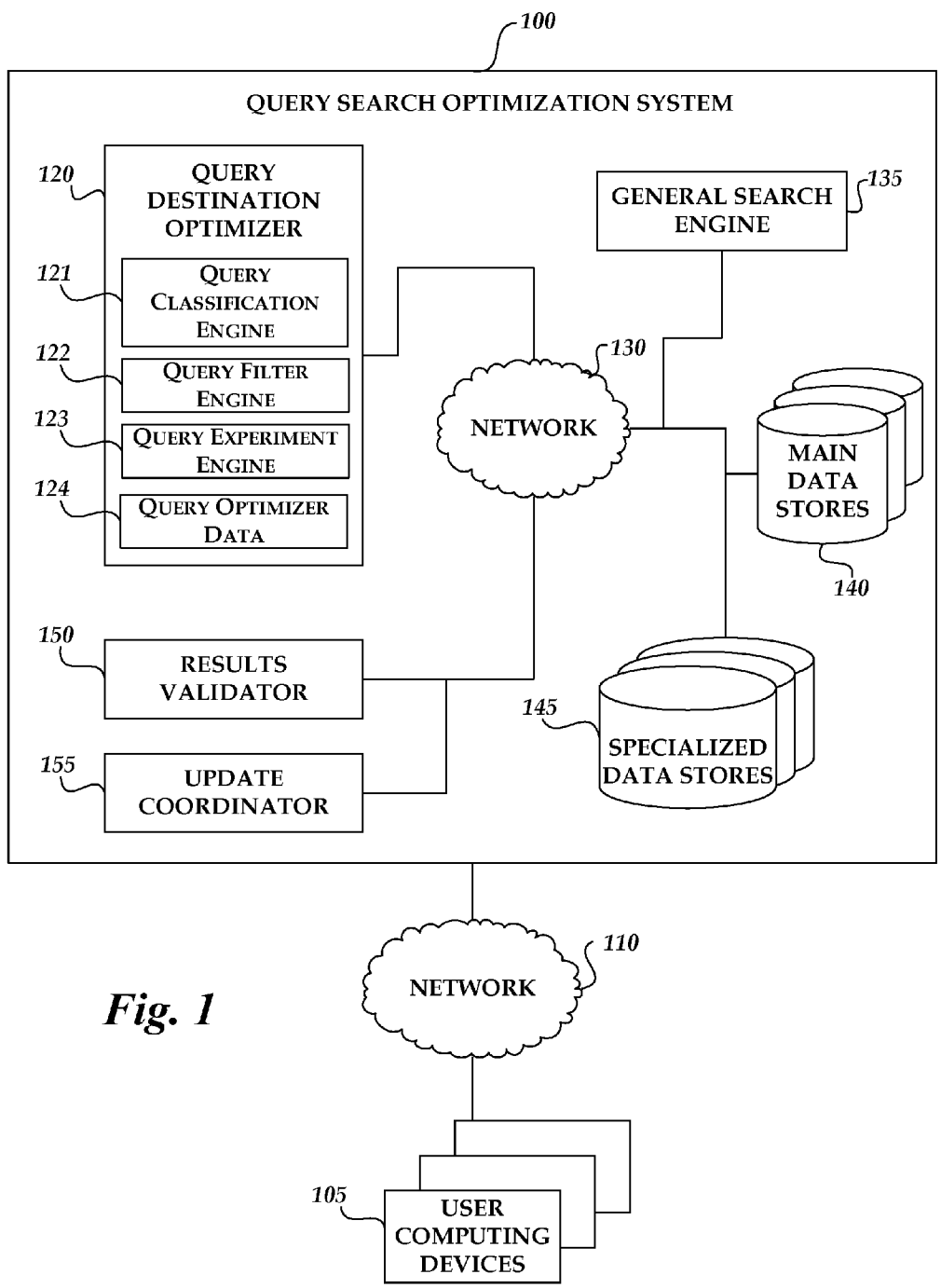
FIG. 1 illustrates the general architecture of a query search optimization system according to one embodiment of the invention.

The present disclosure provides a system and methods for optimizing search system resource usage and performance using multiple data store technologies. Typically systems to manage search traffic route received queries to general, full featured search engines which are configured to execute the queries across very large data stores. The general search engines may be configured with multiple search indexes and further be configured to process complex search queries across multiple data stores and/or search indexes. For example, some queries are best served by a fully featured search engine (e.g. a complex search involving multiple sorting and/or filtering criteria).

Some types of query processing systems (e.g. data stores, key value stores, relational databases, search engines) may be able to process simpler queries more efficiently than a general or full featured search engine. These query processing systems may access or provide access to data stores which may be limited to a certain subset of data and/or be "specialized" or "optimized" to support and process only certain types of queries and/or query syntax efficiently. Such data stores may use a single search index designed for rapid retrieval of search results based on specific search criteria (e.g. looking up all of the results for a given key such as an ISBN, or the full document for a specific listing ID). Generally, a full-featured general search engine is designed to answer any well-formed query, while a specialized data store may be designed to answer only some queries, possibly faster and/or cheaper than other query processing systems. In some embodiments a general search engine may also be configured to answer any well-formed query, but only for a subset of data stored in a main data store. A specialized data store may also be configured to store, and/or to provide query-based access to, a subset of content that is accessible via a general search engine. In some embodiments, some query processing systems may be configured to provide query-based access to catalog content of an electronic catalog of items. For example, a query processing system may include at least one general search engine capable of processing any query on the catalog content and at least one specialized data store, such as an ISBN-based specialized data store configured to process only queries containing an ISBN number. Further, this ISBN-based specialized data store may or may not contain only a subset of the catalog content data, such as a subset of ISBN-only catalog content.

A search query optimization system may be configured to utilize various types of query processing systems in different combinations (e.g. using general search engines and/or specialized data stores) to efficiently and intelligently manage and route queries. A query destination optimizer can combine various types of optimization data, such as information about the queries, the capabilities of different query processing systems, the performance of each query processing system for different queries, and the load on each of them, and use the combined information to make an intelligent decision about how best to route the query. Optimization data may include, for example, data about the performance (e.g. cost, response time, latency, accuracy of results, recency of data, etc.) of various query processing systems. Some benefits of the query destination optimizer may be to lower the average response time per query (e.g. by routing queries to query processing systems optimized for faster query response times), increase accuracy of responses (e.g. by routing queries to query processing systems with more recent data), and/or reduce the cost of hardware utilized to process queries (e.g. by routing queries to specialized data stores which may have lower actual monetary costs than general search engines). Utilizing multiple query processing systems, the query destination optimizer may also benefit from redundancies and "fall back" mechanisms. For example, if one query processing system (e.g. a specialized data store) fails to or cannot answer a query, the query destination optimizer can route the query to another query processing system (e.g. a general search engine) to answer the query.

A search query optimization system may implement several components and sub-systems, such as a query destination optimizer, an update coordinator, and a results validator. For example, the query destination optimizer component of the system may be configured to analyze and classify incoming queries, determine how incoming queries should be routed (e.g. whether a general search engine or a specialized data store should be used to process the query) and evaluate the performance of the various query processing systems. Further, the update coordinator component of the system may be used to coordinate updates to the various data stores in order to further optimize query processing. For example, some data stores specialized for a type of query may be updated to optimize processing of that type of query (e.g. updating to match a common query sort order request). Finally, in some embodiments the results validator component of the system may aid in ensuring that search results are consistent and determining how to process or present query results that may be inconsistent across data stores.

Hardware for each of the query processing systems could also be scaled automatically based on the mix of queries being received by the search query optimization system. An example of when this might occur would be during textbook season when ISBN searches become more common, and so specialized data stores optimized for ISBN searches may be scaled up for usage more than the generic search engine resources.

Various aspects of the system will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims.
Examples of Search Query Optimization Systems FIG. 1 is a general architecture diagram schematically illustrating an example of an query search optimization system 100 that manages and routes received search queries in order to optimize resource usage. The query search optimization system 100 can include any system capable of receiving and processing search queries and providing query results to a requesting entity. For example, in the illustrated embodiment of FIG. 1, the query search optimization system 100 communicates with user computing devices 105 using a network 110 to receive search queries. In FIG. 1, the query search optimization system 100 includes several components, such as a query destination optimizer 120, a results validator 150, and an update coordinator 155, configured to execute the methods for query search optimization described herein. These components may also include further components which may not be depicted in FIG. 1. For example, the query destination optimizer 120 can also include one or more servers (e.g., a web server) configured to receive and respond to requests from the user computing devices 105.

The query search optimization system 100 can also include main data stores 140 and specialized data stores 145 which may store data to be queried. The query search optimization system 100 can also include one or more general search engines 135 which may be used in conjunction with the query destination optimizer 120 and the main data stores 140 to query search results in accordance with the methods further described herein. Main data stores 140 may serve as primary data stores or databases containing a complete set of data, whereas specialized data stores 145 may serve as secondary data stores or databases containing a subset of data organized for efficient or optimized performance of particular types of queries. Specialized data stores may, for example, be key value stores or relational databases, with a single search index designed for a particular query type. Main data stores 140 may be full-featured databases used by the general search engines 135 to process advanced queries such as keyword searches which typically are run over a full data set. The main data stores 140 and specialized data stores 145 are typically partially or fully redundant. The general search engines 135 should be capable of answering the same queries as any of the specialized data stores 145, but the specialized data stores 145 may be optimized to answer specific queries more efficiently than the general search engines 135. The main data stores 140 and specialized data stores 145 may comprise any type of persistent data storage, for example non-volatile memory devices such as, e.g., hard disk drives, optical disk drives, non-volatile solid state memories, etc.

The query destination optimizer 120 may receive, route and/or manage the queries and processes of the query search optimization system 100. The query destination optimizer 120 may receive and process queries received from, for example, user computing devices 105, assess the capabilities of various query processing systems such as the general search engines 135, the main data stores 140 and specialized data stores 145, track and monitor the performance of the various query processing systems for different types of queries, and route queries to the appropriate resources. The query destination optimizer 120 can be in communication with other components of the query search optimization system 100 via a network 130. In the example illustrated in FIG. 1, the query destination optimizer 120 can access the general search engines 135, main data stores 140, specialized data stores 145, results validator 150, and update coordinator 155 via the network 130. The network 130 may include multiple networking devices (not shown) such as, e.g., switches, edge routers, core routers, etc. The network 130 may, but need not be, a different network than the network 110 shown in FIG. 1.

As illustrated in FIG. 1, the query destination optimizer 120 may include several sub-components which may be configured to handle various aspects of receiving, processing, and routing queries. In some implementations, the query destination optimizer 120 may include a query classification engine 121, a query filter engine 122 and a query experiment engine 123.

For example, the query classification engine 121 may be configured to parse a query (e.g. analyze and translate a query string into formatted instructions appropriate for a search engine), analyze the query to identify patterns and/or determine a query type, and classify the query (e.g. assign the query to a known query class and/or define a new query class for a query which does not match a known query class. In some embodiments, the query classification engine 121 may be configured to classify the query using machine learning techniques and algorithms, rather than, or supplemental to, parsing and analyzing the query. In some instances, a query may be formatted as a text string comprising parameter-value pairs which may be parsed and analyzed by the query classification engine 121. These parameters might correspond, for example, to search fields on a user interface search form (e.g., title, author, ISBN, subject, keyword, etc.). In some cases, a query may generally include search terms which may not correspond directly to parameter-value pairs. Such search terms may be provided, for example, via a free-form text input search field in a user interface, and the corresponding query may be formatted as a general string. Such a query may be analyzed by the query classification engine 121 and compared to known patterns to determine what is being requested. For example, an ISBN number is typically formatted in specific, predictable ways (e.g. pattern, number of digits).

In some implementations, a query class or type may represent a category of queries which share a similar parameter or attribute. For example, one query class may be "book search" and queries which include parameters directed to searching on book attributes (e.g., title, author, ISBN) may be associated with this class. A narrower query class may be "ISBN search" and only queries which include an "ISBN" search parameter may be associated with this class. The query classification engine 121 may be configured to determine which query class, if any, to which a query should be associated, or to create new query classes as necessary.

The query filter engine 122 may be configured to analyze a query (and/or a query class) and determine whether the query should be routed to a specialized data store 145. Data store filters may be used to represent an indication of what queries a specialized data store is optimized to process and/or answer efficiently (e.g. inclusion filters). In some embodiments, data store filters may also be used to indicate what queries a specialized data store is not optimized to process and/or answer efficiently (e.g. exclusion filters). Thus a specialized data store may be associated with inclusion filters, exclusion filters, or both. These filters may be associated with known query classes, or with certain query parameters and/or filtering criteria. Continuing the book example, a specialized data store 145 may have a filter which specifies that the specialized data store is optimized for queries in the "book search" or "ISBN search" classes. In another example, a specialized data store may further have a filter which specifies that the specialized data store is optimized to answer queries for "ISBN search" pre-sorted by price. Accordingly such an example specialized data store may not be optimized to answer queries for "ISBN search" pre-sorted by author, and have an associated filter to indicate as such. Alternatively, a specialized data store 145 may not have any filters indicating a particular query class, but instead have a filter which specifies queries containing a certain parameter (e.g. "author"). The query filter engine 122 can analyze these data store filters, compare them to the query and/or the query's class (if known), and make an intelligent decision about which specialized data store is best suited to respond to the query.

The query experiment engine 123 may be configured to experiment with or evaluate the performance of the specialized data stores 145, main data stores 140 and general search engines 135 for various queries, query types or classes. For example, new specialized data stores may become available to the search optimization system, and the system may not yet know which types of queries the specialized data store is optimized to process, or how well the specialized data store performs in processing queries of various types. The query experiment engine may evaluate the performance of a new data store and/or search engine by routing a certain number or percentage of queries to it and assessing its performance for various types of queries. The performance data may be then used, for example by the query filtering engine, to determine whether the specialized data store should be used for certain query types. In some implementations a specialized data store may provide a "seed" to indicate one or more types of queries the data store is optimized to answer. The query experiment engine may then use this seed to, for example, send queries of the matching type to the specialized data store, or, for another example, experiment by sending queries of similar types to the specialized data store, and assess the performance of the specialized data store. Over time the query experiment engine may build a data store mapping the performance of specialized data stores for each query class. Performance data can reflect how well certain types of queries are handled by query processing systems and may include, for example, cost, latency (e.g. response time) and/or accuracy. Further, in some embodiments, the query experiment engine 123 may be configured to execute in conjunction with the query classification engine 121 in order to train the query classification engine 121 on certain types or classes of queries. The query experiment engine 123 may be configured to submit queries to one or more query processing systems in parallel and compare the performance results data received from each query processing system. In another embodiment, the query experiment engine 123 may be configured to submit queries to a percentage of query processing systems and use statistical techniques to average and/or sample the performance results data.

The query destination optimizer 120 may also include a query optimizer data 124 configured to store, update, and retrieve data related to query classes, data store filters, data store and/or search engine performance data, and other data used in conjunction with the search query optimization system 100. The query optimizer data 124 may comprise any type of persistent data storage, for example non-volatile memory devices such as, e.g., hard disk drives, optical disk drives, etc.

In one embodiment, the query search optimization system 100 can further include an update coordinator 155 to coordinate, synchronize and/or optimize updates to the specialized data stores 145 and/or main data stores 140. For example, the update coordinator may be configured to receive document create, update and/or delete requests and modify all of the data stores used to serve queries appropriately. The update coordinator 155 may work in conjunction with the query destination optimizer 120 to determine which specialized data stores are optimized for certain query types or classes. The update coordinator 155 can then update the specialized data stores to further optimize them for their preferred query type, for example by setting up the contents of the data stores for an optimal performance/resource balance (e.g. by inserting and/or updating data pre-sorted by specific criteria). For example, if a particular specialized data store is optimized to process queries ordered by specific criteria (e.g. price), the update coordinator can update the specialized data store with data that is pre-sorted by the specific criteria. This in turn can improve the performance of the specialized data store, as returning pre-sorted data optimized for the query eliminates the time and cost to sort data. Continuing the book example, if there are a lot of ISBN queries with a given sort order, the preprocessed data to serve the first page of these queries might be pushed to a key value store for fast lookup, while queries for a less common sort order might be served by the generic search engine or other query processing system. The update coordinator may also version the data to ensure (e.g. via the results validator 150) that query or search criteria and the data presented can be made consistent and/or differences suppressed.

In some embodiments, the update coordinator 155 may also be configured to automatically create new specialized data stores based on the recognition of patterns in the queries received by the query search optimization system. For example, consider a specialized data store that is optimized to returning books that match a given ISBN sorted by price in the United States. The update coordinator 155 may be configured to recognize a large number of ISBN queries in which the books are to be sorted by price in the United Kingdom. In this example, the update coordinator 155 may be configured to create or re-configure a specialized data store optimized for this UK-specialized query, and then add the specialized data store to the query search system optimization system 100. The query experiment engine 123 can then evaluate the performance of the newly created or re-configured specialized data store as described herein.

In one embodiment, the query search optimization system 100 can further include a results validator 150. The results validator 150 may be used, for example, to make intelligent decisions about which version of query results data should be returned to a user computing device 105 in response to the query. For example, the various data stores utilized by the query search optimization system 100 may be updated sequentially instead of in parallel, which can lead to inconsistency in data. Thus, a query that is routed to a specialized data store 145 may return results which are inconsistent with data in a main data store 140. Thus, in some embodiments, after the search results are returned, the results validator 150 may optionally query a main data store 140 to access full document data corresponding to the search results. The results validator 150 can then analyze any discrepancies in the search results data and the full document data (e.g. by comparing data versions), to determine how inconsistent results should be handled.

Data versioning may be used by the results validator 150 to validate and/or determine which search results to include in a query response. For example, a query might include a parameter to limit the search results on price (e.g. items under $10), but one of the results for the search has had its price recently changed and is now $11. In this example the search index or data store which processed the query may not have been updated with this information, but the main data store used to retrieve the full document data for validation may be up to date (e.g. a newer version of the data than the data in the search index). Consistent versioning of data and/or documents by the query optimization system can enable the system to handle this in various ways. For example, the system might ignore the difference and present the new price even if it breaks the query constraint (e.g. show the $11 item in the initial search results). Or the system might present the older data ensuring the results are consistent, but knowing that the user will see a different price later (e.g. show the item at the under $10 price in the search results, but if the user selects that item for more detail later they may see the $11 price instead). Or, the system might use the differences in versions to identify documents that may have been incorrectly included and efficiently check the results to see if the result is still appropriate (e.g. do not show the $11 item in the initial search results).

In some embodiments, the query search optimization system 100 and its components are executed or embodied by one or more physical or virtual computing systems. For example, in some embodiments, a server computing system that has components including a central processing unit (CPU), input/output (I/O) components, storage, and memory may be used to execute some or all of the components of the query search optimization system 100 such as, e.g., the query destination optimizer 125. The server computing system may also include multiple distinct physical servers or other computing devices. The I/O components can include a display, a network connection to the network 130, a computer-readable media drive, and other I/O devices (e.g., a keyboard, a mouse, speakers, etc.). An embodiment of the query search optimization system 100 can be stored as one or more executable program modules in the memory of the server, and the query search optimization system 100 can interact with computing nodes (e.g., physical computing systems and/or virtual machine instances) over the network 130. In one embodiment, the query search optimization system 100 may have additional components or fewer components than described above. For example, in one embodiment, the general search engines 135, main data stores 140, and/or specialized data stores 145 may be external components which are accessed by the search optimization system 100 over a network (e.g. the network 100). Further, the query search optimization system 100 may be built on top of existing query or search engine systems and/or data stores and be designed to coordinate the actions of the existing systems.

Examples of Methods Performed by a Query Search Optimization System

FIGS. 2, 3, 4 and 5 are logical flow diagrams for various embodiments of query search optimization routines. In some implementations, the routines are performed by embodiments of the query search optimization system 100 described with reference to FIG. 1 or by one of its components, such as the query destination optimizer 120.

Figure 2:
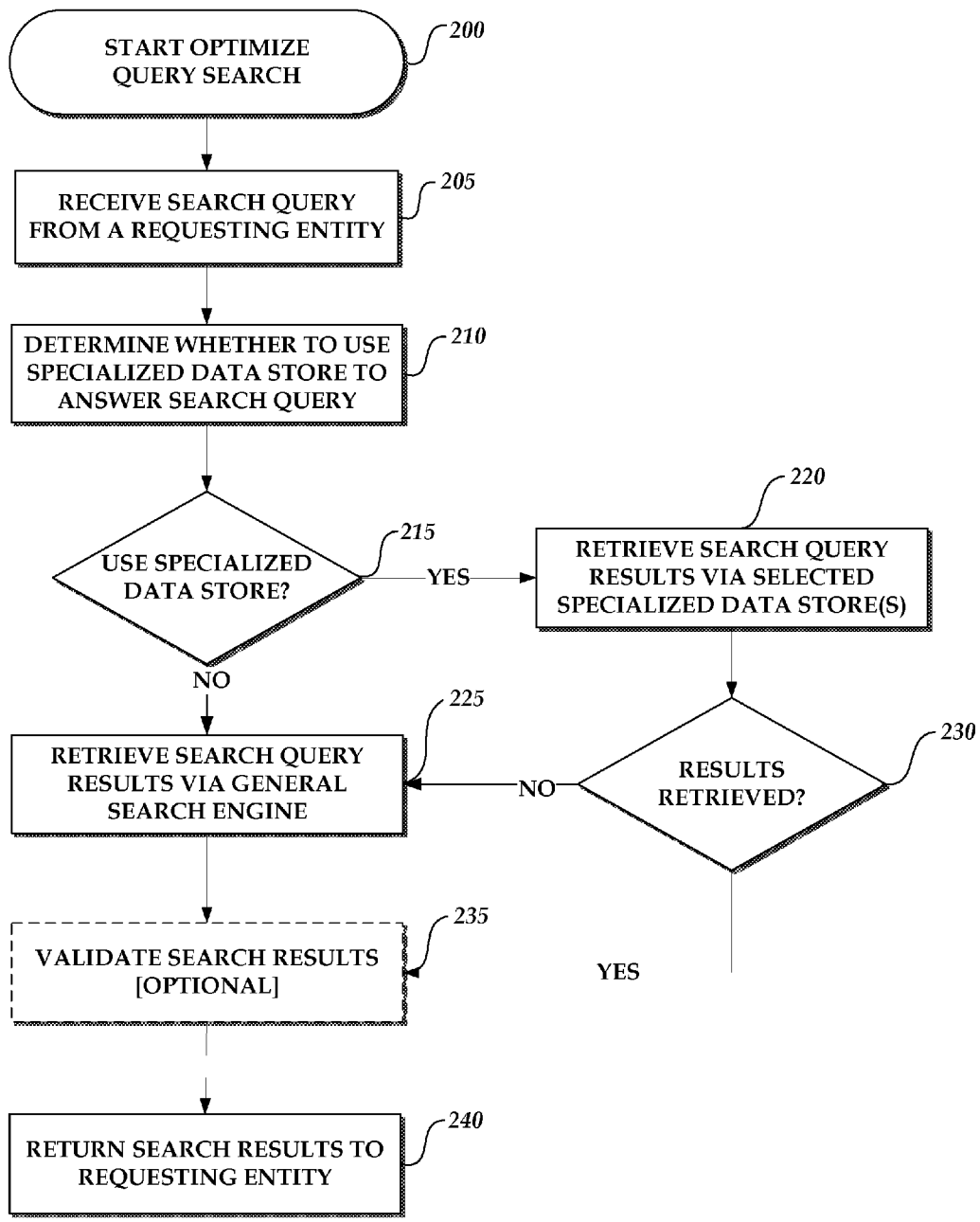
FIG. 2 schematically illustrates a logical flow diagram of a process for optimizing a query search involving the query search optimization system of FIG. 1.

FIG. 2 schematically illustrates a logical flow diagram of a process 200 for optimizing a query search. The process 200 may be executed, for example, by the query destination optimizer 120 of the query search optimization system 100 of FIG. 1. Beginning at block 205, the query search optimization system 100 receives a search query from a requesting entity, for example, from a user computing device 105. At block 210, the query destination optimizer 120 determines whether to use a specialized data store 145 to answer the search query. The determination may be made, for example, according to the determination process described with respect to FIG. 3 herein. If multiple specialized data stores are used, this step may also involve selecting one of them.

At block 215, if a specialized data store is to be used, the process 200 proceeds to block 220, otherwise the process 200 proceeds to block 225. At block 220, the query destination optimizer 120 submits the query to the determined specialized data store and retrieves the results from the specialized data store. The process 200 then proceeds to block 230 where the query destination optimizer 120 determines whether the specialized data store returned the results to the query. In some instances the selected specialized data store may be unable to answer the query. For example, if the specialized data store is under evaluation (see, e.g., the process 400 of FIG. 4), the query destination optimizer may not yet know which types of queries the specialized data store can answer. In some instances the specialized data store may provide an indication that it is unable to answer the query. Thus, if the specialized data store did not return results, the process 200 may proceed to block 225. Otherwise, if the specialized data store returned results, the process 200 proceeds to block 235.

The process continues at block 225 after a determination that a specialized data store is not to be used to answer the query, or a determination that a specialized data store was selected but did not (or could not) return results. At block 225, query destination optimizer 120 submits the query to a general search engine (e.g. one of the general search engines 135) and retrieves the results from the general search engine. Thus, block 225 represents a fallback mechanism such that the query optimization system 100 may service a query using a general search engine if a specialized data store is unavailable or unable to answer the query.

Continuing to block 235 (e.g., from either block 225 or block 230), the search query optimization system 100 may optionally validate the search results, for example via the results validator 150. The results validator 150 may validate search results by accessing a full set of data corresponding to the search results, for example from a main data store 140. The results validator 150 can compare the search results with the full set of data and determine if there are inconsistencies in the data. For example, in some embodiments, the search results data and the main data store data may be versioned to facilitate comparison. If inconsistencies are found the results validator 150 may determine whether search results that violate the query criteria should be provided in the response to the requesting entity. In some embodiments, validation of search results by the results validator 150 may be done only for a selected sample or percentage of the queries that are routed to specialized data stores.

Finally, at block 240, the search query optimization system returns the query search results to the requesting entity, and the routine may end.

Figure 3:
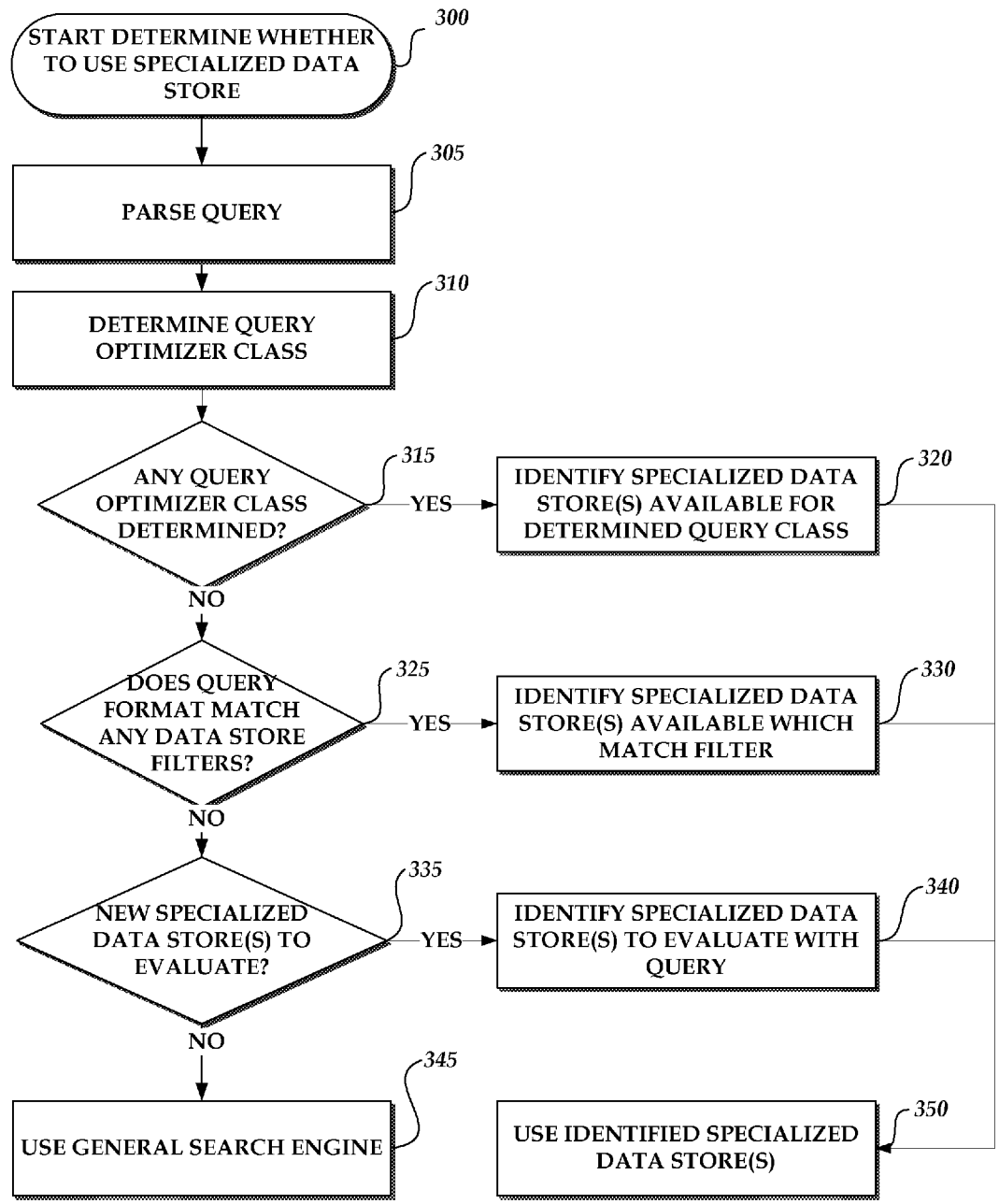
FIG. 3 schematically illustrates a logical flow diagram of a process for determining whether to use a specialized data store involving the query search optimization system of FIG. 1.

FIG. 3 schematically illustrates a logical flow diagram of a process 300 for determining whether to use a specialized data store to answer a query. The process 300 may be executed, for example, by the query destination optimizer 120 of the query search optimization system 100 of FIG. 1. Beginning at block 305, the query destination optimizer 120 parses the query to determine what is being requested in the query (e.g. as indicated by the query string parameters and values). This parsing may be done using standard parsing techniques (e.g. analyze and translate a query string into formatted instructions appropriate for a search engine).

At block 310, the query destination optimizer 120 determines, for example by the query classification engine 121, whether the parsed query matches any known query class types. Known query class data may be retrieved for example, by the query optimizer data 124 component of the query destination optimizer 120. In some implementations a parsed query may match a known query class if the parsed query includes one or more search parameters which are associated with the known query class. The actual number of search parameters which a parsed query needs in order to match a known query class can vary across implementations and may depend, for example, on the definition of the query class.

Continuing to block 315, the query destination optimizer 120 determines whether the parsed query matches any known query class types based on the analysis performed at block 310. If a matching query class is found, the process 300 proceeds to block 320. If a matching query class is not found, the process 300 proceeds to block 325.

At block 320, the query destination optimizer 120 identifies any specialized data stores 145 that may be used to answer queries of the determined query class. The identification may be based in part on query optimizer data 124 stored by the query destination optimizer 120. For example, the query optimizer data 124 may include a mapping of known or previously identified specialized data stores and query classes for which the specialized data stores are optimized to answer efficiently. After identifying any specialized data stores which may be used to answer the query, the process 300 may continue to block 350, discussed below.

Alternatively, the process 300 may continue at block 325 after a determination that the query does not match any known query class types. At block 325, the query destination optimizer 120 may next determine whether the parsed query matches or corresponds to any known data store filters. Known data store filters may be retrieved for example, by the query optimizer data 124 component of the query destination optimizer 120. If a data store filter appropriate for the query is found, the process 300 proceeds to block 330. If no appropriate data store filter is found, the process 300 proceeds to block 335.

At block 330, the query destination optimizer 120 identifies any specialized data stores 145 that are associated with the determined data store filter. The identification may be based in part on query optimizer data 124 stored by the query destination optimizer 120. For example, the query optimizer data 124 may include data indicating which data store filters apply to which specialized data stores. After identifying any specialized data stores which may be used to answer the query, the process 300 may continue to block 350, discussed below.

Alternatively, the process 300 may continue at block 335 after a determination that the query does not match any data store filters. At block 335, the query destination optimizer 120 may next determine whether there are any new specialized data stores 145 which are to be evaluated (e.g. for performance). Evaluation of specialized data stores is discussed in more detail with respect to process 400 of FIG. 4. If any new specialized data stores to be evaluated are found, the process 300 proceeds to block 320. If no new specialized data stores to be evaluated are found, the process 300 proceeds to block 325.

At block 340, the query destination optimizer 120 identifies the new specialized data stores 145 to evaluate with the query. The identification may be based in part on query optimizer data 124. For example, the query optimizer data 124 may include an indication of new specialized data stores that are available to process queries, but have unknown capabilities (e.g. what type of queries the data store can process efficiently) and/or unknown performance values (e.g. cost, latency, accuracy, etc.).

Finally, the process 300 may end at either block 345 or block 350. At block 345, the process 300 terminates after the query optimization system 100 determines that there are no specialized data stores available or appropriate for the given query. In this scenario the query destination optimizer 120 may then use the general search engine to answer the query, for example in accordance with the process 200 described with respect to FIG. 2 herein. At block 350, the query destination optimizer 120 uses one or more of the identified specialized data stores to answer the query, for example in accordance with the process 200 described with respect to FIG. 2. If more than one specialized data store is identified by the process 300, the query destination optimizer 120 may decide which specialized data store to use based on, for example, load balancing considerations, performance data, or some other appropriate criteria.

Although not depicted in FIG. 3, in another variation on the process 300, the query optimization system 100 may determine that the general search engine should be used even though one or more specialized data stores have been identified as able and/or available to answer the query. For example, the search query optimization system 100 may route the query to the general search engine if the specialized data stores are busy or overloaded. In some implementations the query optimization system 100 may only route a limited percentage of queries to specialized data stores. In some implementations the percentage of queries to route may increase or scale up automatically in response to an increased number of queries received. In some implementations the search query optimization system may use performance data associated with the identified specialized data stores to determine which to use. For example, a specialized data store ordinarily having lower performance may nevertheless be used if a higher-performance specialized data store is currently heavily loaded.

Figure 4:
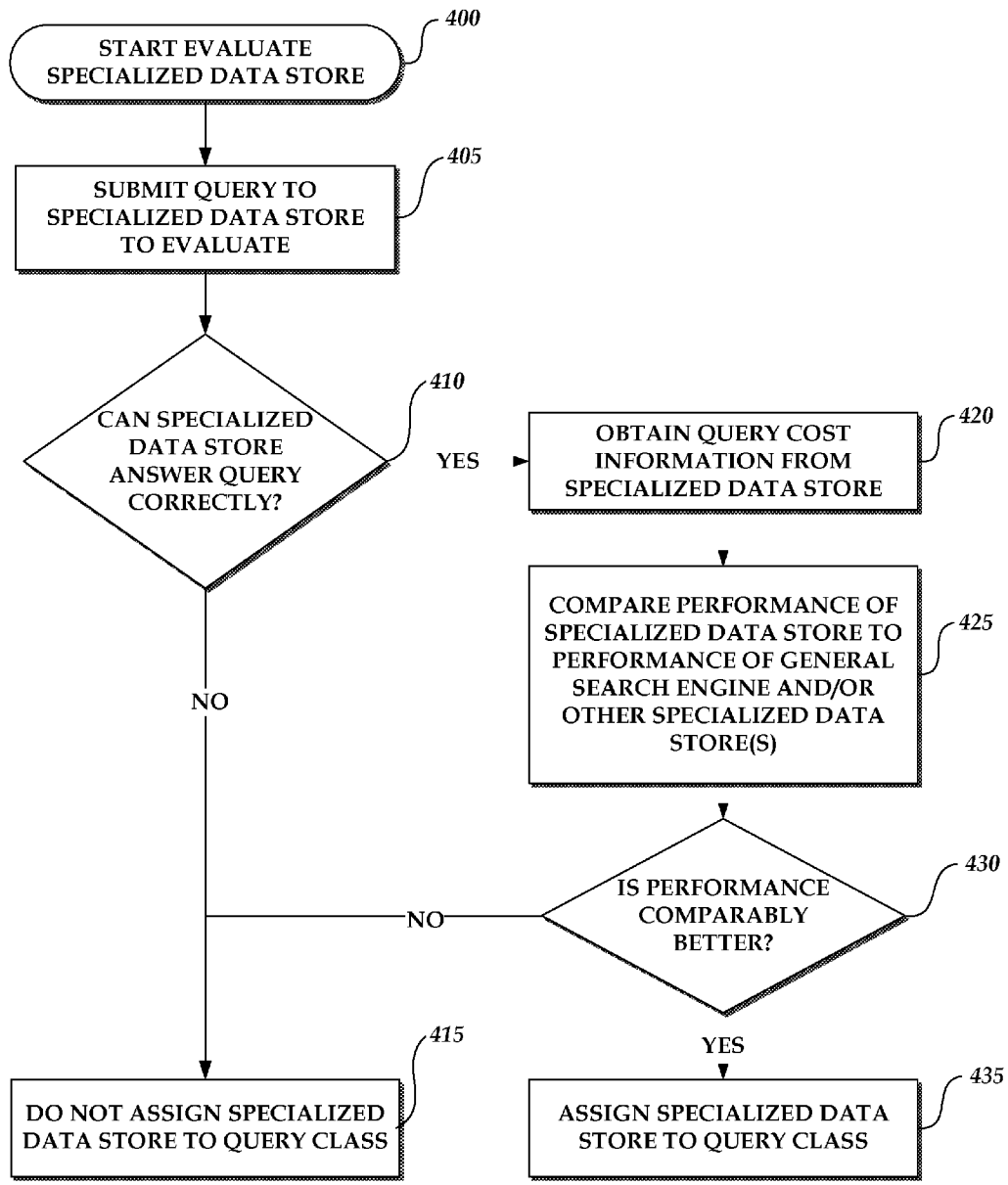
FIG. 4 schematically illustrates a logical flow diagram of a process for evaluating a specialized data store for use in the query search optimization system of FIG. 1.

FIG. 4 schematically illustrates a logical flow diagram of a process 400 for evaluating a specialized data store. The process 400 may be executed, for example, by the query experiment engine 122 of the query destination optimizer 120 of FIG. 1. Beginning at block 405, the query experiment engine 122 submits a query to a specialized data store to be evaluated. Typically, this submission is in response to query destination optimizer 120 receiving the query from a user computing device; however, this need not be the case. For example, the query experiment engine could proactively send pre-selected queries to specialized data stores.

At block 410, the query experiment engine 122 determines whether the specialized data store can answer the query correctly. In some implementations the query destination optimizer 120 may submit the query to a specialized data store to make this determination. In some scenarios the specialized data store may return an indication that is unable to answer the query correctly. In some scenarios when the specialized data store returns search results, the results validator 150 may be used to validate or check for accuracy, for example by accessing data in the main data stores 140.

If the query experiment engine 122 determines that the specialized data store cannot answer the query correctly, the process 400 proceeds to block 415. At block 415, the query experiment engine 122 stores data, for example by the query optimizer data 124, to indicate that the specialized data store is unable to answer this query and/or may be unable to answer a class of query. In some embodiments, determining that the specialized data store may be unable to answer a class of query may be based on various test cases using many different queries. The process 400 can then end.

If the specialized data store can answer the query correctly, the process 400 proceeds to block 420 to further analyze the specialized data store's performance. At block 420, the query experiment engine 122 obtains query cost and/or performance data from the specialized data store. Cost and/or performance data may include various factors such as the cost of hardware used by the specialized data store, query response time and/or recency of the data. Continuing to block 425, the query experiment engine 122 compares the performance of the specialized data store to the performance of the general search engine and/or other specialized data stores. Cost and/or performance data for the general search engine and/or other specialized data stores may be stored, updated, and retrieved from the query optimizer data 124. At block 430, the query experiment engine 122 determines whether the performance of the specialized data store is comparably better than the general search engine and/or other specialized data stores. The comparison may be absolute or relative and may be based on any combination of one or more performance indicators (e.g. cost, latency, accuracy, recency of data, etc.). In some embodiments, the performance evaluation may be based on the overall performance of the specialized data store, and/or the "current" performance of the specialized data store (e.g., the average response time over the last N queries processed, or over the last M seconds, which may provide an indication of "current" load conditions). If the performance is determined not to be comparably better, the process 400 proceeds to block 415. At block 415, the query experiment engine 122 may store data, for example by the query optimizer data 124, to indicate that the specialized data store is not optimized to answer this query and/or class of query. Performance data may also be stored and made available for future analysis, comparison, and/or evaluation. The process 400 can then end.

If the performance is determined to be comparably better, the process 400 proceeds to block 435. At block 435, the query experiment engine 122 may store data, for example by the query optimizer data 124, to indicate that the specialized data store is optimized to answer this query and/or class of query. Performance data may also be stored and made available for future analysis, comparison and/or evaluation. In some embodiments, the performance data and/or performance evaluation may be based on response times collected over the course of many query processing events. The process 400 can then end.

Figure 5:
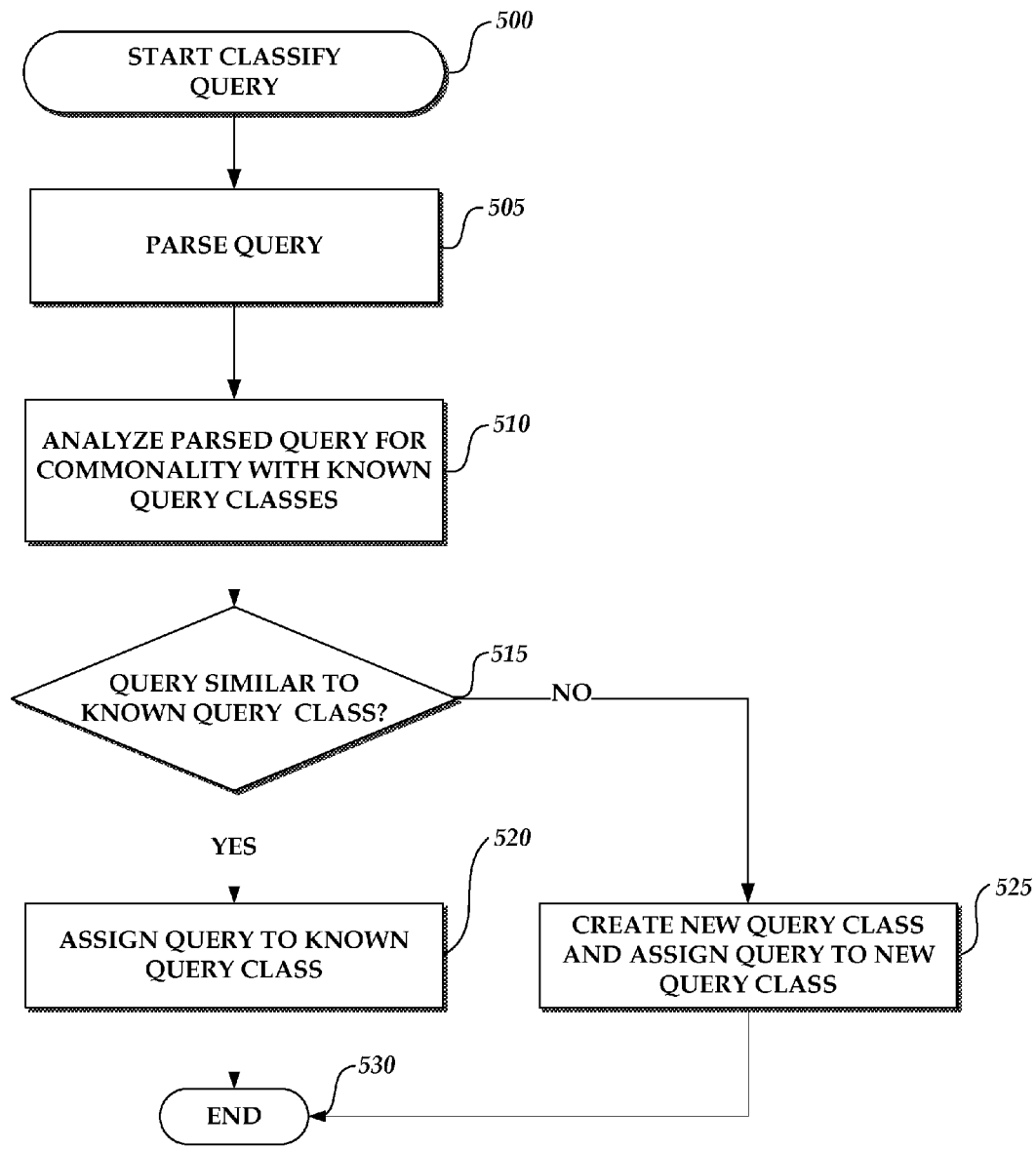
FIG. 5 schematically illustrates a logical flow diagram of a process for classifying a query using the query search optimization system of FIG. 1.

FIG. 5 schematically illustrates a logical flow diagram of a process 500 for classifying a query using the query search optimization system of FIG. 1. The process 500 may be executed, for example, by the query classification engine 121 of the query destination optimizer 120 of FIG. 1. Beginning at block 505, the query classification engine 121 parses the query, for example, as discussed with reference to block 305 of FIG. 3 herein. At block 510, the query classification engine 121 analyzes the parsed query to determine whether the query shares commonalities with other known query classes. For example, a parsed query may share the parameter "author" with a known query class "book search."

At block 515, the query classification engine 121 assesses whether the query is similar to any known query class. If the query is found to be similar, the process 500 proceeds to block 520 and the query is assigned to or associated with the known query class. If the query is not found to be similar, the process 500 proceeds to block 525.

At block 525 the query classification engine 121 may optionally determine that a new query class should be created based on the parsed query, and assign or associate the query with the newly created query class. The query class information may be stored in, for example, the query optimizer data 124. In this way the query optimization system 100 can adapt and learn about recurring queries and/or query parameters so as to improve the system efficiency over time.

The process 500 may proceed from block 520 or block 525, to block 530 where the process 500 may end.

Variations

As will be apparent, many variations of the query search optimization system 100 described above are possible. For example, in some implementations the query classification engine 121 may be configured to analyze aggregate incoming query or search traffic and make determinations about the frequency or degree of commonality of searches or query class types. These data could then be used to determine, for example, which types of specialized data stores are in higher demand. In some implementations the search query optimization system may be configured to use such data to dynamically re-assign or re-configure specialized data stores, such as via the update coordinator, to more efficiently meet this demand over time.

As described above, the query search optimization system 100 can be implemented with one or more physical servers or computing machines, such as several computing machines interconnected via a network. Thus, each of the components depicted in the query search optimization system 100 can include hardware and/or software for performing various features. The executable code modules of the query search optimization system 100 can be stored on any type of non-transitory storage system or device (e.g., solid state memories, hard disk drives, etc.).

The processing of the various components of the query search optimization system 100 can be distributed across multiple machines, networks, and other computing resources. Each of the components depicted in the query search optimization system 100 can include hardware and/or software for performing various features. The various components of the query search optimization system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

The query search optimization system 100 can include one or more servers for receiving and responding to network requests from the user computing devices 105. The one or more servers can include web servers, application servers, database servers, combinations of the same, or the like. In some embodiments, the query search optimization system 100 is a web site, a collection of web sites or a web service. For example, the query search optimization system 100 may be a web service made available to 3rd party developers by a web services provider for a fee or for free. In some embodiments, the network 110 is a publicly accessible network of linked networks, possibly operated by various distinct parties, such as the Internet. In other embodiments, the network 110 may be a private network, such as, for example, a corporate or university network that is wholly or partially inaccessible to non-privileged users. In still other embodiments, the network 110 may include one or more private networks with access to and/or from the Internet.

Each of the processes, methods, and algorithms described in the preceding sections may be embodied in, and fully or partially automated by, code modules executed by one or more computers, computer processors, or other machines configured to execute computer instructions. The code modules may be stored on any type of non-transitory computer-readable medium. The processes and algorithms may alternatively be implemented partially or wholly in application-specific circuitry. The results of the disclosed analyses and process steps may be stored, persistently or otherwise, in any type of non-transitory computer storage such as, e.g., volatile or non-volatile storage.

The various features, processes, and decision criteria described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the scope of protection.

What is claimed is:

1. A computer-implemented method, comprising:
    receiving a search query from a user computing device;
    analyzing, by execution of code by a query optimization system comprising one or more computing devices, the search query to determine a class of the search query;
    identifying, by the query optimization system, one or more specialized data stores available to answer the search query, based at least in part on the class of the search query and whether the one or more specialized data stores are able to accurately answer queries of the class;
    determining, by the query optimization system, whether to use one of the identified specialized data stores to answer the search query, wherein the determining is based at least in part on performance data associated with respective specialized data stores, wherein the performance data indicates at least (1) an average response time associated with respective specialized data stores in answering search queries and (2) recency of data stored by respective specialized data stores
    when a determination is made to not use one of the specialized data stores, retrieving search results for the search query using a general search engine; or
    when a determination is made to use one of the specialized data stores:
        selecting for use to answer the search query a specialized data store from the one or more identified specialized data stores, wherein the selected specialized data store has a lowest average response time and/or more recently stored data;
        attempting to retrieve the search results for the search query using the selected specialized data store;
        determining whether the search results were retrieved from the selected specialized data store; and
        when a determination is made that the search results were not retrieved from the selected specialized data store, retrieving the search results for the search query using a general search engine; and
    returning the retrieved search results to the user computing device.

2. The method of claim 1, further comprising:
    identifying one or more data stores to be evaluated available to answer the search query;
    retrieving the search results from the one or more data stores to be evaluated;
    retrieving performance data from the one or more data stores to be evaluated, wherein the performance data is based at least in part on the response time in retrieving the search results;
    evaluating the performance data retrieved from the one or more data stores to be evaluated; and
    identifying one or more of the data stores to be evaluated as specialized data stores, based at least in part on the performance evaluation.

3. The method of claim 1, further comprising:
    retrieving updated document data associated with the search results; and
    validating the search results, based on a comparison of the search results to the associated updated document data.

4. The method of claim 1, further comprising:
    identifying similarities between the search query and one or more query classes, wherein the query classes are associated with previous search queries;
    assigning the search query to one or more query classes, based at least in part on the identified similarities;

identifying one or more specialized data stores available to answer the search query, based at least in part on the one or more query classes to which the search query is assigned.

5. The method of claim 1, wherein the class of the search query indicates a type of data being requested.

6. A system comprising:
a physical computer system comprising one or more computer processors, the physical computer system programmed to:
receive a search query from a user computing device;
classify the search query, based at least in part on query parameters associated with the search query;
identify one or more specialized data stores available to answer the search query, based at least in part on the search query classification and whether the one or more the specialized data stores are able to accurately answer queries classified under the search query classification;
determine whether at least one of the specialized data stores should be used to answer the search query, wherein the determination is based at least in part on performance data associated with respective specialized data stores, wherein the performance data reflects at least (1) an average response time associated with respective specialized data stores in answering search queries and (2) recency of data stored by respective specialized data stores;
if least one of the identified specialized data stores should be used to answer the search query, retrieve the search results for the search query using a selected one of the identified specialized data stores, wherein the selected specialized data store has a lowest average response time and/or more recently stored data; or
if none of the identified specialized data stores should be used to answer the search query, retrieve the search results for the search query using a general search engine; and
transmit the retrieved search results to the user computing device.

7. The system of claim 6, wherein to identify one or more specialized data stores available to answer the search query the physical computer system is further programmed to:
access one or more data store filters associated with the one or more specialized data stores, wherein each data store filter indicates one or more query classes the associated specialized data store is configured to answer; and
determine the one or more specialized data stores available to answer the search query by comparing the accessed data store filters to the search query classification.

8. The system of claim 7, wherein the physical computer system is further programmed to update data in the one or more specialized data stores based on the one or more data store filters.

9. The system of claim 6, wherein to classify the search query, the physical computer system is further programmed to:
determine one or more parameters of the search query;
retrieve data related to one or more query classes, the query classes associated with previous search queries;
identify similarities between the one or more parameters of the search query and the one or more query classes; and
associate the search query with one or more query classes, based at least in part on the identified similarities.

10. The system of claim 6, wherein the physical computer system is further programmed to:
identify one or more data stores to answer the search query;
retrieve the search results from the one or more data stores;
retrieve performance data from the one or more data stores;
evaluate the performance data retrieved from the one or more data stores; and
categorize one or more of the data stores as specialized data stores, based at least in part on the performance evaluation.

11. The system of claim 10, wherein the one or more data stores answer queries of one or more query classes.

12. The system of claim 10, wherein the performance data includes at least one of (1) a response time in retrieving the search results, (2) version data related to the search results, (3) an indication of whether the data store was able to answer the search query, (4) a cost of retrieving the search results, and (5) a hardware cost associated with the data store.

13. The system of claim 10, wherein to categorize one or more of the data stores as specialized data stores the physical computer system is further programmed to:
for each data store in the one or more data stores having a minimum performance valuation:
access one or more query classes associated with the search query;
define one or more data store filters corresponding to the query classes; and
associate the data store with the one or more data store filters.

14. The system of claim 10, wherein the physical computer system is further programmed to log the performance data.

15. The system of claim 10, wherein to determine whether one of the specialized data stores should be used to answer the search query the physical computer system is further programmed to:
access performance data associated with each of the specialized data stores; and
determine whether each of the specialized data stores should be used to answer the search query based on the accessed performance data.

16. The system of claim 6, wherein the physical computer system is further programmed to:
retrieve updated document data associated with the search results; and
determine the validity of the search results, based at least in part on a comparison of the search results to the associated updated document data.

17. The system of claim 16, wherein the physical computer system is further programmed to remove, from the search results, search results which are determined to be invalid.

18. A system for processing search queries, the system comprising:
a plurality of query processing systems, each of which provides query-based access to a respective set of content, wherein the sets of content at least partially overlap with each other such that, for at least some search queries, different query processing systems are capable of providing the same content in response to the same search query; and
a query optimization system comprising one or more computer processors, wherein the query optimization system generates, for each query processing system, performance data regarding an ability of the query processing system to respond to each of a plurality of classes of search queries, wherein the performance data is generated based on observed performance of the query processing systems in responding to search queries, wherein the query optimization system additionally responds to a search query from a user computing device by using at least the performance data generated for the plurality of query processing systems to select a particular query processing system to which to route the search query for processing, wherein the performance data includes query-class specific response data reflective of how accurately each query processing system can answer queries of a particular class, wherein the performance data indicates at least (1) an average response time associated with respective query processing systems in answering respective search queries and (2) recency of data stored by respective query processing systems, and wherein selection of the particular query processing system to route the search query for processing includes selecting query processing system having a system lowest average response time and/or selecting the particular query processing system storing more recent data.

19. The system of claim 18, wherein the performance data includes query-class specific response time data reflective of how quickly each query processing system can process queries of a particular class.

20. The system of claim 18, wherein the query optimization system responds to the search query from the user computing device by determining a class of the search query, and by using class-specific performance data associated with the class to select between the query processing systems.

21. The system of claim 18, wherein each query processing system provides query-based access to catalog content of an electronic catalog of items.

* * * * *